United States Patent [19]

Chandrasekaran

[11] 3,853,811

[45] Dec. 10, 1974

[54] FLAME RESISTANT ETHYLENE-CHLOROTRIFLUOROETHYLENE COPOLYMER COMPOSITIONS

[75] Inventor: Swayambu Chandrasekaran, East Orange, N.J.

[73] Assignee: Allied Chemical Corporation, New York, N.Y.

[22] Filed: May 7, 1973

[21] Appl. No.: 358,210

[52] U.S. Cl............ 260/45.75 K, 161/403, 117/201, 260/45.7, 260/45.7 P, 260/45.75 B
[51] Int. Cl.......................... C08f 45/56, C08f 45/62
[58] Field of Search.................... 260/45.75 K, 87.5

[56] References Cited
UNITED STATES PATENTS

| | | | |
|---|---|---|---|
| 3,211,768 | 10/1965 | Considine | 260/45.75 |
| 3,412,125 | 11/1968 | Welch et al. | 260/45.75 |
| 3,418,267 | 12/1968 | Busse | 260/45.75 |
| 3,501,446 | 3/1970 | Ragazzini et al. | 260/87.5 |
| 3,644,859 | 2/1972 | Moore et al. | 260/45.75 |
| 3,723,383 | 3/1973 | Cyba | 260/45.75 |
| 3,745,145 | 3/1971 | Khattab | 260/45.75 |

Primary Examiner—Donald E. Czaja
Assistant Examiner—V. P. Hoke
Attorney, Agent, or Firm—Roger H. Criss; Michael S. Jarosz

[57] ABSTRACT

A flame resistant ethylene-chlorotrifluoroethylene copolymer composition comprising the copolymer and a flame retardant compound selected from the group consisting of tin oxides, tin phosphates, stannous oxalate and mixtures thereof. Preferred flame retardant compounds include stannic oxide hydrate, stannous phosphate (tribasic), stannous oxalate and stannous pyrophosphate.

9 Claims, No Drawings

FLAME RESISTANT ETHYLENE-CHLOROTRIFLUOROETHYLENE COPOLYMER COMPOSITIONS

BACKGROUND OF THE INVENTION

1. Field of the Invention

This invention relates to flame resistant ethylenechlorotrifluoroethylene copolymer compositions.

2. Description of the Prior Art

Copolymers of ethylene and chlorotrifluoroethylene, particularly copolymers containing about equimolar amounts of ethylene and chlorotrifluoroethylene units, exhibit highly desirable properties including outstanding resistance to solvents, both organic and inorganic, as well as acids and bases. They have high tensile strength, high melting points and excellent electrical properties. When stabilized they are readily melt processable by conventional extrusion and injection molding techniques to form useful articles. These polymers are also flame resistant, being self-extinguishing in air and having a Limiting Oxygen Index in the range of about 55–60. It would be desirable, however, if the flame resistance could be improved so that the polymers would be self-extinguishing in oxygen-enriched atmospheres, containing, for example, up to about 70 percent oxygen, such as exist in manned spacecraft.

SUMMARY OF THE INVENTION

It has been discovered that the addition of certain tin compounds to copolymers of ethylene and chlorotrifluoroethylene dramatically increases the flame resistance of the copolymers. In accordance with this invention, a composition is provided which comprises a copolymer of ethylene and chlorotrifluoroethylene and a flame retardant compound selected from the group consisting of tin oxides, tin phosphates, stannous oxalate and mixtures thereof.

DESCRIPTION OF THE PREFERRED EMBODIMENT

Copolymers of ethylene and chlorotrifluoroethylene are well known and can be prepared by various known processes. Such processes include those shown in Hanford U.S. Pat. No. 2,392,378, which shows copolymerization of ethylene with chlorotrifluoroethylene in a stirred aqueous medium at superatmospheric pressure using benzoyl peroxide as catalyst; in Nucleonics, September, 1964, pp. 72–74, disclosing formation of a high melting (237°C.) 1:1 alternant copolymer of ethylene and chlorotrifluoroethylene prepared using a radiation catalyst at 0°C.; in British Patent 949,422, showing bulk copolymerization of ethylene with chlorotrifluoroethylene at temperatures between −80° to +50°C. using oxygen-activated alkyl boron catalysts; in Ragazzini et al. U.S. Pat. Nos. 3,371,076 and 3,501,446, relating to methods for making ethylene/chlorotrifluoroethylene copolymers using oxygen-activated boron-containing catalysts and to products obtained by that process. About equimolar ethylene/chlorotrifluoroethylene copolymers having high melting point above 200°C. can also be prepared by batchwise bulk copolymerization of the monomers at temperatures of about 0°C., say between about −20° to +20°C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amounts of chain transfer agents, such as chloroform or heptane. The desired copolymer product is obtained as a dispersion in the monomer.

The ethylene/chlorotrifluoroethylene copolymers employed herein are high molecular weight, normally solid thermoplastic polymers preferably containing between about 40 to about 60 mol percent of ethylene units and correspondingly between about 60 and about 40 mol percent of chlorotrifluoroethylene units in the molecule and have melting points above about 200°C. More preferably, there is employed in this invention about equimolar copolymers containing between about 45 to about 55 mol percent of ethylene units and correspondingly between about 55 to about 45 mol percent of chlorotrifluoroethylene units and having melting points of about 220°C. and higher, preferably between about 220°C. and about 265°C. The preferred copolymers have a melt index of from 0.5 to 5.

As flame retardants, there is added to the ethylene-chlorotrifluoroethylene copolymer an effective amount of a tin compound selected from the group consisting of tin oxides, tin phosphates, stannous oxalate and mixtures thereof. The term "tin oxides" includes stannous oxide, stannic oxide and stannic oxide hydrate. The term "tin phosphates" includes stannous phosphate (tribasic), stannous pyrophosphate, stannous hydrophosphate, stannous dihydrophosphate, stannous metaphosphate, stannic pyrophosphates and stannic oxydiphosphate. Preferred tin compounds include stannic oxide hydrate, stannous phosphate (tribasic), stannous pyrophosphate and stannous oxalate.

It has been found that the above tin compounds increase the Limiting Oxygen Index (L.O.I.) of the copolymers to at least about 70. Moreover, compositions of ethylene-chlorotrifluoroethylene and stannic oxide hydrate, stannous phosphate (tribasic) or stannous oxalate as flame retardants are also rated self-extinguishing according to the NASA flammability test described below. As a result, compositions of ethylene-chlorotrifluoroethylene which include these flame retardant additives are suitable for use in oxygen-enriched atmospheres such as exist, for example, in manned spacecraft. In general, the atmospheres employed in manned spacecraft utilize a mixture of approximately 70 percent oxygen and 30 percent nitrogen, by volume. The compositions of this invention are flame resistant, at least as measured by the L.O.I. test, under such conditions.

The amount of the flame retardant tin compound added to the copolymers is preferably in the range of about 0.1 to about 20 percent by weight of the copolymer, more preferably about 5 to about 15 percent by weight. Of course, the particular amount of the tin compound additives depends upon the environment in which such compounds are intended to be utilized, relative costs, as well as other factors which are apparent to those skilled in the art. Particularly preferred amounts of each of the four preferred tin compounds are approximately as follows, based on the weight of the copolymer:

| | |
|---|---|
| stannic oxide hydrate ($SnO_2 \cdot xH_2O$, $x = 1$–$1.5$) | 10–15% |
| stannous phosphate (tribasic) ($Sn_3(PO_4)_2 \cdot xH_2O$, $x = 0.5$–$2.0$) | 5–10% |
| stannous oxalate ($SnC_2O_4$) | 10–15% |
| stannous pyrophosphate ($Sn_2P_2O_7$) | 5–10% |

It is indeed surprising that the tin compounds specified above are as effective as they are in rendering ethylene-chlorotrifluoroethylene copolymers flame resistant. For example, although it has been previously been reported that stannic oxide hydrate is as effective a flame retardant synergist with a chlorine source as is antimony oxide in polyvinyl chloride, polyethylene, polypropylene and acrylonitrile-butadiene-styrene copolymers, stannic oxide hydrate by itself is much superior than antimony oxide as a flame retardant for ethylene-chlorotrifluoroethylene copolymers. Whereas compositions of such copolymers including stannic oxide hydrate are self-extinguishing in a 70:30 oxygen:-nitrogen atmosphere, compositions including antimony oxide at the same levels are not self-extinguishing. Moreover, other tin-containing compounds are likewise not effective flame retardant agents for ethylene-chlorotrifluoroethylene compositions in high oxygen content atmospheres.

The ethylene-chlorotrifluoroethylene copolymer compositions may include conventional stabilizer systems. An example of one such system is a three component mixture of a phosphite of an organic polyhydric phenol, a salt of a carboxylic acid and a metal of Group II of the Periodic Table and an ester or alkali metal salt of thiodipropionic acid. Such a mixture is disclosed, for example, in copending U.S. application of Khattab et al., Ser. No. 124,913, filed Mar. 16, 1971 now U.S. Pat. No. 3,745,145. Other stabilizer systems may of course be used.

The flame retardant additive may be admixed with the copolymer using conventional mechanical procedures. Preferably, the flame retardant additive is dry blended with the copolymer and the mixture thereafter blended again at temperatures above the melting point of the copolymer to provide a homogeneous blend.

The compositions of this invention may be formed into a variety of articles by such conventional processes as extrusion, molding, coating, etc. They may be used, for example, in clothing, webbing, electrical insulation, coatings and paints to provide flame resistant products suitable for use in oxygen-enriched atmospheres.

EXAMPLES

In a series of examples, compositions of ethylenechlorotrifluoroethylene copolymer and various additives were prepared. The copolymer employed was an equimolar copolymer having a melt index of 2.5 and a melting point of 242°C. and included 0.45 percent by weight of a conventional stabilizer system. The copolymer and the additive were dry blended for about 3 hours in a ball mill and the mixture was then melt blended for 20 minutes at 260°C. in a Brabender plastigraph at a screw speed of 50 rpm. The blend was discharged from the plastigraph and test specimens were molded at 260°C.

The test specimens were tested for their L.O.I. in accordance with ASTM Test D–2836. The L.O.I. test is a measurement of the minimum oxygen concentration, expressed as a volume percent, in a mixture of oxygen and nitrogen that will support combustion of a compression molded bar for 3 minutes when ignited from above.

The test specimens were also tested for their self-extinguishing properties in accordance with Test No. 1, Upward Propagation Rate Test, NASA Document MSC–PA–D–67–13, as amended. In accordance with such test, samples 2½ inches wide and 5 inches long and 10 mils nominal thickness are vertically mounted in a test chamber which is charged with a 70 percent oxygen, 30 percent nitrogen atmosphere at a total pressure of 6.2 psia. A nichrome wire wrapped with silicone rubber is used as the ignition source and the sample is ignited at the mid point of its width at the bottom. The distance that the flame progresses before extinguishing is recorded. Materials in which burning is extinguished within 3 inches of the ignition point are rated "self-extinguishing."

The results are recorded in Table I.

TABLE I

| Example | Sample | Additive | L.O.I. | Self-Extinguishing* |
|---|---|---|---|---|
|  | Control |  | 58 | No |
| 1 | 5% | Stannic Oxide Hydrate | 80.5 | No |
| 2 | 10% | do. | 84 | Yes |
| 3 | 15% | do. | 93.4 | Yes |
| 4 | 5% | Stannous Oxalate | 77 | No |
| 5 | 10% | do. | >95 | Yes |
| 6 | 15% | do. |  | Yes |
| 7 | 3% | Stannous Phosphate, Tribasic |  | No |
| 8 | 4% | do. |  | No |
| 9 | 5% | do. | 87 | Yes |
| 10 | 10% | do. | >95 | Yes |
| 11 | 15% | do. |  | Yes |
| 12 | 5% | Stannous Pyrophosphate | 80 | No |
| 13 | 10% | do. | 82 | No |
| 14** | 5% | Antimony Trioxide | 69 |  |
| 15** | 10% | do. | 70 | No |
| 16** | 15% | do. | 67 | No |
| 17** | 5% | Tetraphenyl tin | 57.5 |  |
| 18** | 10% | Triphenyltin Chloride |  | No |
| 19** | 10% | Red Phosphorus | 44 |  |
| 20** | 10% | Hydrated Alumina |  | No |
| 21** | 10% | Trilauryl Phosphite |  | No |
| 22** | 10% | Triphenylisodecyl Phosphite |  | No |
| 23** | 10% | Di-n-propyltin Dichloride |  | No |
| 24** | 15% | do. |  | No |
| 25** | 10% | Tricresyl Phosphate |  | No |

\* = NASA Upward Propagation Rate Test
\*\* = comparative example

As is apparent from the results listed in Table I, compositions including stannic oxide hydrate, stannous oxalate, stannous phosphate (tribasic) and stannous pyrophosphate exhibit substantially increase in L.O.I. over the ethylene-chlorotrifluoroethylene copolymer control to levels above an L.O.I. of 70 and in most cases above 80. In addition, at levels of 5 percent of stannous phosphate (tribasic), 10 percent stannic oxide hydrate and 10 percent stannous oxalate (Examples 9, 2 and 5), the compositions are rated as self-extinguishing under the NASA Upward Propagation Rate Test. Of the additives tested, only those samples which included the tin compounds of this invention are rated self-extinguishing under the NASA test. In addition, it can be seen by comparing the results of Examples 1-3 and 14-16 that stannic oxide hydrate is a superior flame retardant additive for ethylene-chlorotrifluoroethylene than antimony trioxide, both with respect to L.O.I. and the NASA test. Furthermore, it is surprising that the tin compounds of this invention render the copolymers flame resistant whereas other tin compounds as well as other known flame retardant additives do not exhibit high L.O.I.s and/or self-extinguishing characteristics.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A composition comprising a copolymer of ethylene and chlorotrifluoroethylene, said copolymer containing between about 40 to about 60 mol percent of ethylene units and correspondingly between about 60 and about 40 mol percent of chlorotrifluoroethylene units, and an effective amount of a flame retardant additive selected from the group consisting of tin oxides, tin phosphates, stannous oxalate and mixtures thereof.

2. The composition of claim 1 wherein said copolymer contains between about 45 to about 55 mol percent of ethylene units and correspondingly between about 55 and about 45 mol percent of chlorotrifluoroethylene units.

3. The composition of claim 1 wherein said flame retardant additive is present in an amount between about 0.1 to about 20 percent by weight of the copolymer.

4. The composition of claim 3 wherein said flame retardant additive is present in an amount between about .5 to about 15% by weight of the copolymer.

5. The composition of claim 1 wherein said flame retardant additive is stannic oxide hydrate.

6. The composition of claim 1 wherein said flame retardant additive is tribasic stannous phosphate.

7. The composition of claim 1 wherein said flame retardant additive is stannous oxalate.

8. The composition of claim 1 wherein said flame retardant additive is stannous pyrophosphate.

9. The composition of claim 2 including a stabilizer system comprising a mixture of a phsophite of an organic polyhydric phenol, a salt of a carboxylic acid and a metal of Group II of the Periodic Table and an ester or alkali metal salt of thiodipropionic acid.

* * * * *